United States Patent [19]

Clement

[11] Patent Number: 5,797,616
[45] Date of Patent: Aug. 25, 1998

[54] UNIVERSAL COUPLER GUIDE SYSTEM

[76] Inventor: David Clement, 4231 Pascal Pl., Palos Verdes Estates, Calif. 90274

[21] Appl. No.: 642,741

[22] Filed: May 3, 1996

[51] Int. Cl.$^6$ ........................................... B60D 1/36
[52] U.S. Cl. ............................... 280/477; 280/511
[58] Field of Search ........................... 280/477, 511; 224/519, 520, 521

[56] References Cited

U.S. PATENT DOCUMENTS

| | | | |
|---|---|---|---|
| 3,420,549 | 1/1969 | Robinson | 280/477 |
| 4,560,183 | 12/1985 | Cook | 280/477 |
| 4,840,392 | 6/1989 | Baskett | 280/477 |
| 4,844,496 | 7/1989 | Webb et al. | 280/477 |
| 4,871,185 | 10/1989 | Chakroff et al. | 280/477 |
| 4,974,866 | 12/1990 | Morgan | 280/477 |
| 5,236,215 | 8/1993 | Wylie | 280/477 |
| 5,330,196 | 7/1994 | Ricles | 280/477 |
| 5,503,422 | 4/1996 | Austin | 280/477 |
| 5,529,330 | 6/1996 | Roman | 280/477 |

FOREIGN PATENT DOCUMENTS

| | | | |
|---|---|---|---|
| 0963504 | 2/1975 | Canada | 280/477 |

*Primary Examiner*—William A. Cuchlinski, Jr.
*Assistant Examiner*—John L. Beres
*Attorney, Agent, or Firm*—John E. Halamka

[57] ABSTRACT

A guide system arrangement for a tow vehicle having a ball. The guide system is universally mountable on the upper surface of a bumper or on the draw bar of the hitch of the tow vehicle by providing non-rotatable pillars to the side and in front of the ball and wings removably attachable to the pillars forming a wide V channel which accepts most couplers attached to a trailer vehicle to position the coupler above the ball as the tow vehicle is driven toward the trailer vehicle. Upon lowering of the coupler onto the ball, the stepped stop formed in the wing portion of the guide system releases any tension that may have been formed during the guide process so that the wings may be removed from the pillars for storage thereby allowing a variety of accessories to be mounted on the pillars for use either while the vehicle is in motion or stationary. If the accessories are too heavy or unstable, a support may be coupled onto the ball to provide a tripod mounting for the accessory.

15 Claims, 2 Drawing Sheets

UNIVERSAL COUPLER GUIDE SYSTEM

BACKGROUND OF THE INVENTION

1. Field of the Invention

This invention relates to the art of linking vehicles together and more particularly to the positive guiding of the coupler of one vehicle toward and over the ball hitch of the other vehicle whereby the coupler may be engaged on the ball. Further, once the guiding function is accomplished, the guide may be removed and certain accessories mounted on the support for the guide system to enhance cargo handling and utility.

2. Description of the Prior Art

With the growing popularity of recreational vehicles, an entire family of trailers has been generated to accommodate the towing of such items as travel trailers, off road vehicles, boats, horse trailers, utility trailers and other recreational sport items.

Each manufacturer of a trailer utilizes a preferred size and shape of the coupler as well as closure of the coupler over the ball. The towing vehicles also exhibit a plethora of different sizes and types of bumpers, hitch frames, draw bars and balls.

The sizes, shapes and heights of the two items to be linked are not standardized.

Prior solutions have attempted to utilize a V shaped guide to direct the coupler toward and over the ball. With the non-standardized items, the solutions taught by the prior art are very specialized and do not solve the final problem of allowing the coupler to be lowered onto the ball and then have the V shaped guide removed so that the trailer has freedom to articulate.

Further, each patent in the prior art does not teach how or even suggest that any of the V shaped guides taught therein could be adapted to fit any other tow vehicle hitch or other combination of coupling elements used by any other vehicle manufacturer in forming a hitch for a specific vehicle or available to the user as an alternative to the very specialized guide device taught in each individual patent.

Additionally, some of the prior art has taught a V channel configuration which has an initial opening of merely 6 inches, practically requiring a guide system to get to the guide system. Once the guide system is used to bring the coupler over the ball, nothing in the prior art teaches how to relieve any built up torsion or bending experienced in the alignment process.

U.S. Pat. No. 4,871,185 attempts to solve the problem by mounting a V shaped guide to the top of the hitch. The patent teaches that the hitch must have a flat surface and the guide must be adjustable to position the coupler over the ball. The Patent does not teach how, if the coupler is positioned against the guide, to be able to remove the guide once the coupler is engaged with the ball.

U.S. Pat. No. 5,236,215 teaches the mounting of a V channel onto a hitch but also teaches the permanent mounting of a guide pin onto the coupler to practice the guiding of the coupler over the ball. '215 is taught to be limited for use only on trucks with step bumpers and not to be used with autos or MPVs. Further '215 cannot be used with bumper clamp on trailer hitches, such as those available from trailer rental firms. '215 is only for use with a bumper as shown in the patent and requires post 11 to be welded to the trailer. '215 is further limited as to the types of couplers, especially with locking devices, that may be attached to the trailer. Finally, '215 when placed in the stored position, as taught, does not meet present bumper requirements for any vehicle.

Most trailers are equipped with a "jack" to adjust the vertical height of the coupler above the vertical height of the ball. Because of the weight of the trailer, it is not practical to manually move the coupler horizontally, especially in a fore and/or aft direction. The tow vehicle may be driven to adjust the horizontal and the fore and/or aft alignment, but because the coupler and ball are hidden, this is a blind, trial and error movement or requires an observer for immediate feedback.

Thus there has long been a need for an arrangement utilizing adaptive shapes integrated into an integrated system rather than a simple "clamp on guide" taught by the prior art which accommodates an extremely limited combination of couplers and balls.

It is desired that the guide system be of substantial construction to withstand the considerable forces generated in positioning the coupler yet be light enough to be manageable, storable and convenient to use.

It is desirable that the guide system allow a wide margin of error of initial alignment of the tow vehicle with the trailer. The major goal of the guide system is to align the ball with the coupler by simply getting in the way. The fine tuning of alignment can be performed as the movement of the frame of the trailer usually allows for torque and bending to be made during the guide system function.

It is desirable that the alignment process result in the coupling of the vehicles and provide a method to relieve any torque and bending built up by the coupler or the ball hitch arrangement during the alignment process.

It is desirable that under the condition of the coupler being attached to the ball, any portion of the guide system which was initially in an extend position be removable without first relieving any stress built up by either the trailer or tow vehicle frame.

SUMMARY OF THE INVENTION

Accordingly, it is an object of the present invention to provide an improved guiding arrangement with a wide opening to allow the final alignment positioning, especially in the fore and aft direction, to be achieved from a very coarse initial alignment.

It is another object that the guide device be of substantial construction to withstand the stress of alignment even when the initial alignment is at the very edge of the guide.

It is yet another object that the guide device be light weight and of a size that is convenient to assemble, disassemble and store.

It is yet another object that the pillars of the guide device be easily positioned and installed on existing equipment so that the wings of the guide device can be removed without having to first move the tow vehicle and trailer to relieve any accumulation of torque and bending stress built up by the alignment process.

It is yet another object that the guide device be of a configuration which does not interfere with loading, opening of doors, opening of gates, etc. on the tow vehicle or trailer even if the support for the V portion of the guide device is left in place while the trailer is not coupled to the tow vehicle.

It is yet another object that the guide device provide a support for accessory equipment to assist in handling additional cargo or utility functions either while the vehicles are in motion or stationary.

The above and other objects of the present invention are achieved, according to a preferred embodiment thereof, by providing an improved guide system utilizing non-rotatable pillars mounted to the side and in front of the ball. In the preferred embodiment, a base plate which is universally mountable on commercially available trailer hitch arrangements provides a convenient mounting point for the pillars. For some configurations, the base plate may not be required as the non-rotatable pillars may be directly mounted in front and to each side of the ball of the hitch or bumper. The pillars removably receive wing attachments each having a guiding surface which in opposition form a V shaped guide channel positioned so that the ball of the hitch is located at the apex of the V channel. The wings guide the coupler toward the ball. The apex of the V channel incorporates a stop shaped to further guide the coupler over the ball and allow the wings to be removed from the pillars. The pillars may also be used as supports for selected attachments to the tow vehicle even if the tow vehicle is still connected to the trailer vehicle.

BRIEF DESCRIPTION OF THE DRAWINGS

The above and other embodiments of the present invention may be more fully understood from the following detailed description, taken together with the accompanying drawing, wherein similar reference characters refer to similar elements throughout, and in which.

DESCRIPTION OF A PREFERRED EMBODIMENT

Figure 1:
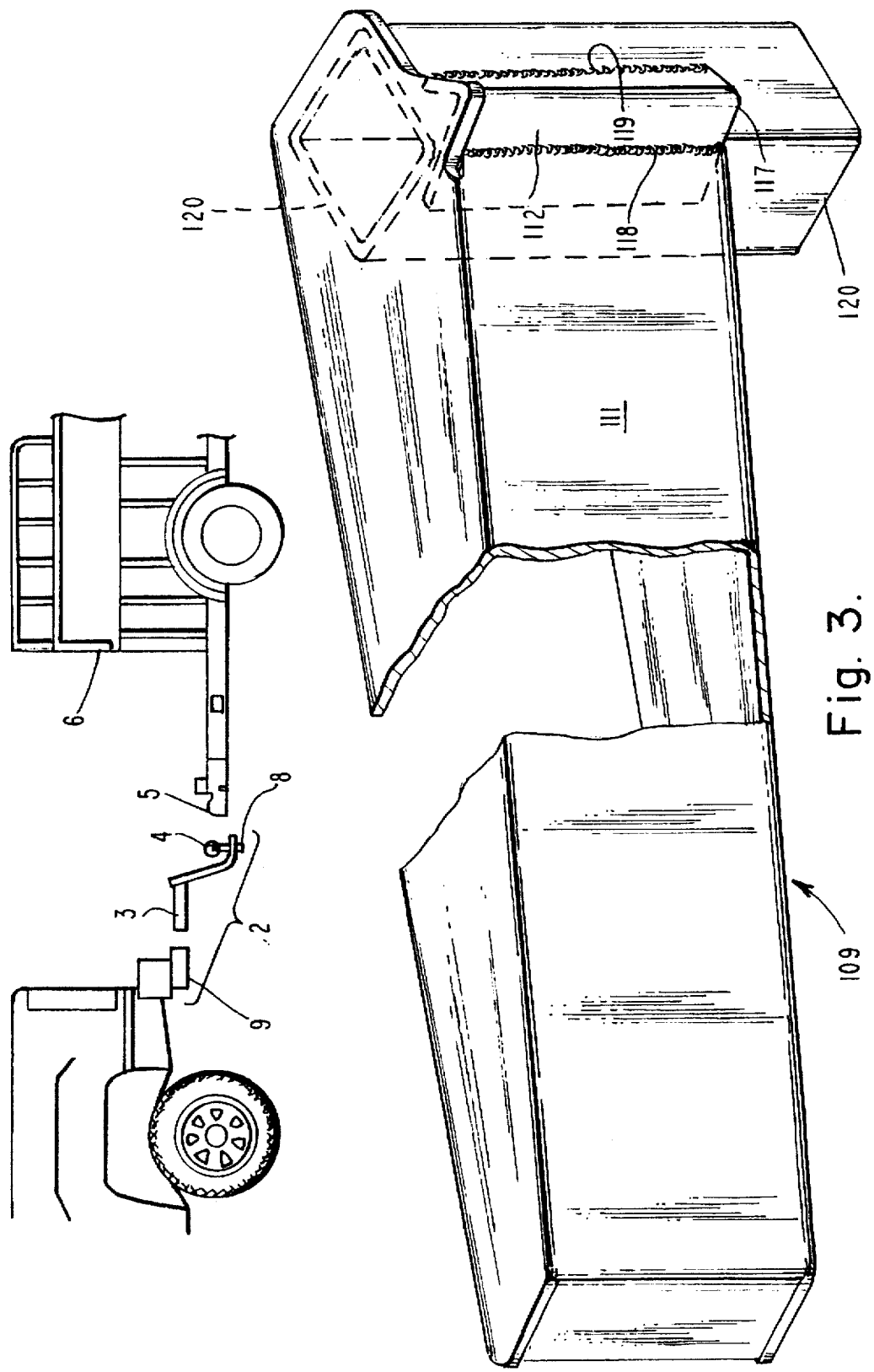
FIG. 1 is a schematic diagram of a general coupling arrangement.

Referring now to the drawing, FIG. 1 shows a generalized arrangement of an attachment system to couple a tow vehicle 1, having a hitch 2 mounted at the rear of the tow vehicle 1. The hitch 2 is comprised of a hitch receiver 9 into which a draw bar 3 is inserted and secured. The draw bar 3 has a ball 4 mounted near the end, by means of a shank 8. A coupler 5 mounted on the tongue of the trailer vehicle 6 is engaged over and attached to the ball 4 to secure the vehicles together.

The configuration of the draw bar 3 and placement of the mounting hole therein for the shank 8 of the ball 4 is totally variable. Some configurations allow the ball 4 to be positioned level with the hitch receiver 9, some are above and some are below. The draw bar 3 may be of various shapes, sizes and configurations. The diameter of the ball 4 may be one of various available diameters. The shank 8 may also be one of various available diameters, all depending upon the load bearing, weight and towing rating for the combination of draw bar 3, ball 4, shank 8 and the load rating of the tow vehicle 1 as suggested by each trailer manufacturer.

The design of the drop down draw bar 3 which places the ball 4 below the hitch receiver 9 has usually resulted in the placement of the ball 4 as close to the curve on the draw bar 3 as possible to reduce stress. If a drop down draw bar 3 is paired with a coupler 5 having a wide apron, the result is a minimum clearance between the ball 4 and the draw bar 3 for placement of any guide system. As discussed below, this invention presents one solution to overcoming this minimum clearance by shaping the base plate 103 so that it will lay flat on the upper, horizontal surface of the draw bar 3 and allow the pillars 107 to be mounted to the side and in front of the ball 4 by straddling the draw bar 3.

Other solutions such as mounting the pillars directly onto the draw bar 3 or positioning the base plate 3 on the vertical portion of the draw bar 3 are practical and produce the desired result of providing pillars 107 to the side and in front of the ball 4 upon which wings 109 may be mounted to establish a guide system 10.

Some tow vehicles 1 are manufactured with a bumper having a mounting hole for the shank 8 of a ball 4. A guide system 10 as taught by this invention could be fabricated by directly mounting pillars 107 onto the bumper in a position to the side and in front of the ball 4.

Each trailer manufacturer utilizes a preferred coupler 5. Some edges of the coupler 5 are vertically straight, some are curved, and some have an apron edge extending beyond the vertical sides. The selected coupler 5 will only accept a ball 4 diameter for which it was designed.

Because of the non-standardized shape, placement, mounting options, variations as to simple load carrying or load distributing hitch receiver 9 arrangements, the spatial location of the ball 4 in relation to the coupler 5 is completely arbitrary. The guiding arrangement taught by this invention will function with most combinations of commercially available equipment. The teaching may also be incorporated in most special built hitch and coupler arrangements.

The tongue of the trailer vehicle 6, on which the coupler 5 is mounted, is generally horizontally movable from side to side but the force to move the coupler 5 fore and aft is great. The side to side movement is possible because of the allowance for torque and bending of the under carriage of the trailer coupler 5 mounting system designed by the manufacturer. The fore and aft movement maybe supplied by the tow vehicle 1. It is the combination of these movements that allow the guide system 10 to function.

The user of a certain combination of tow vehicle 1 and trailer 6 is usually limited by the recommendation of the manufacturer as to the type of hitch 2 to be attached to the tow vehicle 1 and limited as to the type of coupler 5 attached to the trailer 6.

Moving the tow vehicle 1 to position the ball 4 attached to the tow vehicle 1 near the coupler 5 of the trailer 6 is difficult as most the the positioning is simply blind driving of the tow vehicle backwards toward and hopefully under the coupler 5.

Figure 2:
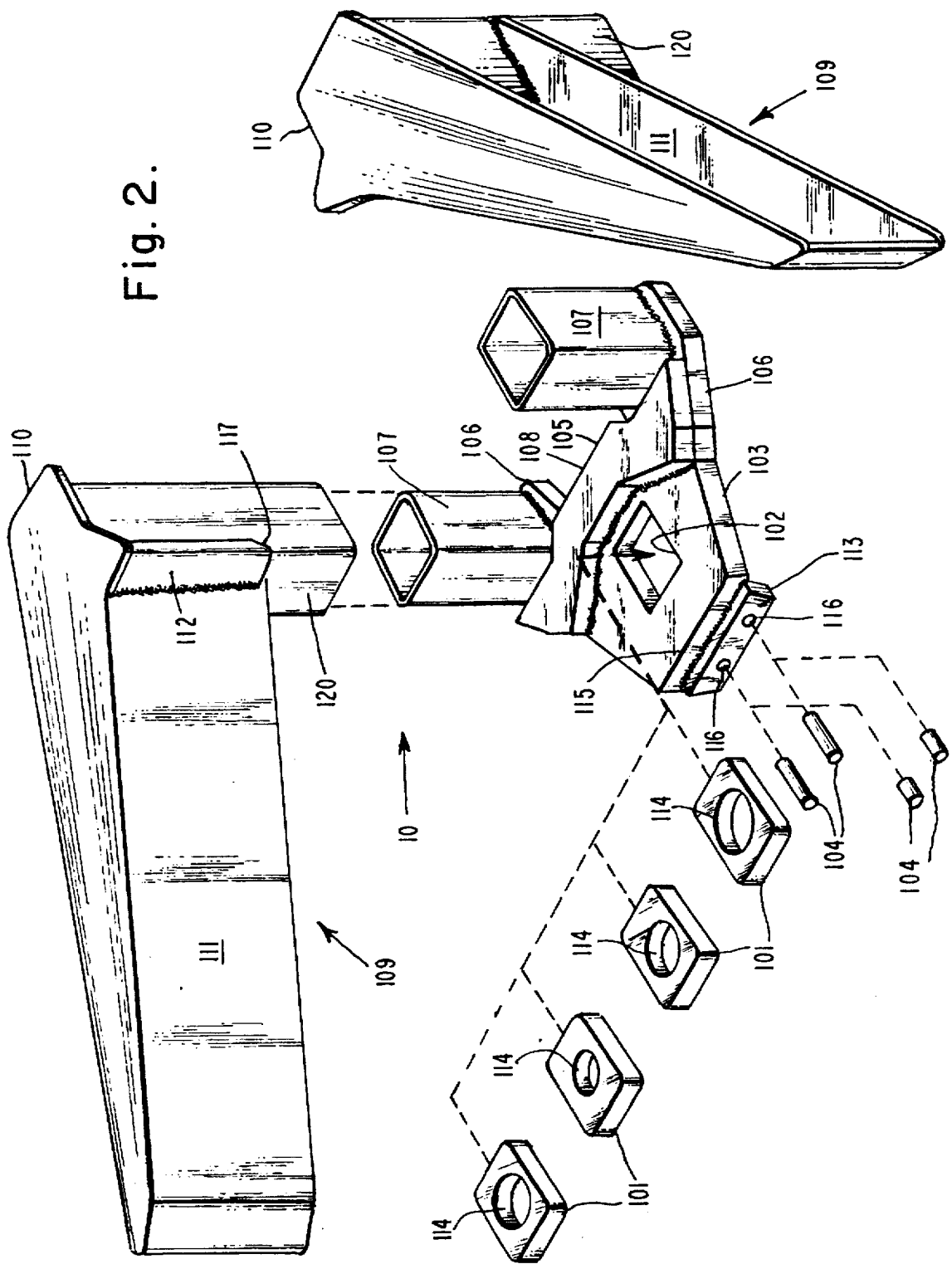
FIG. 2 is a perspective, disassembled view of the guide system; and, FIG. 3 is a perspective view of a wing.

Referring now to the drawing, FIG. 2 shows the preferred embodiment of the guide system, generally designated 10, according to the invention. This embodiment is an add on to any existing hitch/coupling system. The guide system 10 may also be fabricated as an integral part of the hitch/coupling system.

In the preferred embodiment, a torque plate 113 is mounted onto the rear most edge 115 of the base plate 103. A preselected number of second walls 116 are formed as threaded holes for set screws 104.

The torque plate 113 may be mounted on the underside of the base plate 103 in a position to be parallel to each side of the draw bar 3 to render the base plate 103 non-rotatable. On a broad flat surface such as a stepbumper, no torque plate 113 may be necessary as the set screw holes 116 may be simple bolt holes to attach the base plate 103 to a flat surface in a non-rotational configuration.

A plurality of offset inserts 101 are provided. The offset inserts 101 may be formed as one piece or may be split into preselected portions to allow more versatility in positioning the base plate 103 fore and/or aft for coupler 5 alignment and positioning of the torque plate 113 to attain a non-rotatable configuration with the pillars to the side and in front of the ball.

A plurality of offset inserts 101 are depicted, each having first walls 114 in a different location. It is this set of offset inserts 101 which allow the universal mounting of the invention onto the draw bar 3. The user will select an offset insert 101 to be mounted into the receiver 102 formed in the base plate 103. The base plate 103 and offset insert 101 are mounted on the draw bar 3 of the tow vehicle by means of the shank 8 of the ball 4.

For a guide system 10 fabricated as an integral part of the hitch/coupler system, it is important to position the pillars 107 to the side and in front of the ball 4 to allow clearance for removably mounting the wings 109 onto the pillars 107 to correctly position the coupler 5 over the ball 4.

The front edge 105 of the base plate 103 is shaped so that it may accommodate a downward curved draw bar 3 and allow the base plate 103 to lie flat on the upper surface of the draw bar 3.

The placement in the draw bar 3 of the mounting hole for the shank 8 of a ball 4 is another highly variable factor. However, the plurality of offset inserts 101 allow the user of the guide system 10 to mount it on almost any commercially available draw bar 3 arrangement the user may have on the tow vehicle. The placement of first walls 114 and the diameter forming a hole in each offset insert 101 is selected to allow the base plate 103 to be centered onto the upper surface of the draw bar 3 while allowing the front edge 105 to be aligned with the upper surface of the draw bar 3, even if it is curved. The base plate 103 should also be positioned so that the torque plate 113 is extending beyond the rear most edge of the draw bar 3 and the pillars 107, described below, are positioned in front of and to each side of the ball 4.

The shank 8 of the ball 4 is then inserted through the hole formed by first walls 114 and the mounting hole in the draw bar 3 so that the offset insert 101 and base plate 103 may be secured to the upper surface of the draw bar 3.

In combination with the shank 8, a number of set screws 104, of a preselected length, may be mounted within second walls 116 and adjusted to secure the arrangement of the torque plate 113 and base plate 103 into a non-rotating position on the draw bar 3 by tightening the set screws 104 until they contact an edge of the draw bar 3. The torque and bending forces created by the positioning of the coupler 5 over the ball 4 by the guide surface 111 of the wings 109 may be extensive. The providing of a rough surface on the bottom of the base plate 103 or tightening the bolt of the shank 8 may be insufficient to prevent rotation of the base plate 103 during the alignment procedure which allows the pillars 107 and wings 109 to become mis-aligned. Further, this rotation of the base plate 103 may loosen the fastening device which holds the shank 8 onto the draw bar 3.

The base plate 103, as taught by this invention, may be formed as an integral part of the draw bar 3, thus eliminating the need for a torque plate 113 and plurality of set screws 104 to prevent rotation of the base plate 103. The following teaching applies to an add on base plate 103 or base plate 103 fabricated as part of the draw bar 3 or hitch 2 arrangement.

Pillar mounts 106 are formed in the base plate 103 on each side of the front edge 105. For the integral hitch/coupler system, a surface which accomplishes the function of the pillar mounts may already exist as the upper surface of a step bumper. A pillar 107, of a preselected length of non-rotatable cross section, is mounted on each pillar mount 106 in a position to be in front of and to each side of the ball 4. In the preferred embodiment, the cross section of the pillar is square.

Another inventive step is the selection of the placement of the pillar mounts 106 in front of the ball and to the side enough to accommodate the guide wings 109, described below, while not interfering with the function of any commercially available drawbar 3, hitch 2, or ball 4. This may be accomplished by shaping of the base plate 3.

However, the removal of material required for the placement of the front edge 105 on the upper surface of the draw bar 3 to allow the base plate 103 to be used on various draw bars 3, particularly a drop down design, may compromise the structural integrity of the base plate 103 at the ends of the front edge 105. A bow tie 108 may be mounted on the base plate 103 to add structural strength to withstand the torque and bending forces expected during the guiding function. Of course, if the base plate 103 is fabricated as an integral part of the draw bar 3, the structural integrity of the entire draw bar 3 may be designed as a whole without the requirement for special reinforcements as the bow tie 108.

Removable wings, generally designated 109, are provided as the guide edges of a V shaped opening. The remote end 110 of the wing 109 forms a pillar sleeve 120 which is shaped generally as a hollow, non-rotatable cross section, which may be removably mounted over a pillar 107 so that the guide surface 111 of each wing 109 are in opposing alignment to form the V shaped guiding channel. The guide surface 111 should be fabricated of a smooth, generally planer shape and of a material which will withstand the scraping, under the intense forces of guiding of the coupler during the alignment process, without pitting. The guide surface 111 may be fabricated of or have a coating of a material which has a low coefficient of friction. The remote portion of each guide surface 111 near the apex of the V channel is formed as a stop 112 of a preselected vertical size. The vertical size of the stop 112 is selected to provide for a two step procedure. First, the stop 112 contacts the coupler 5 to halt the initial forward movement of the coupler 5 toward the apex of the V channel as the tow vehicle 1 is moved toward the trailer vehicle 6. The next movement, which is performed during the lowering of the coupler 5 onto the ball 4, is the completion of the forward movement of the coupler 5, if necessary, even if the coupler 5 has an extended apron, by allowing the edge of the coupler 5 to slip under the bottom edge 117 of the stop 112. This continued forward movement is a very short movement toward the apex of the V channel so that the coupler 5 is exactly positioned over and may continue to be lowered to engage the ball 4. Without this step wise stop 112, the final positioning of the coupler 5 over the ball 4 and engagement with the ball 4 could not be accomplished without a great deal of additional force to move the trailer vehicle 6 fore or aft or the repositioning of the tow vehicle 1. Further, without this stepwise alignment and installation procedure, the coupler 5 may remain against the stop 112 and/or guide surface 111 usually with sufficient force built up by the tongue of the trailer 6 from the alignment process that the wings 109 could not be removed after the coupler 5 is engaged with the ball 4. The use of this step wise stop 112 allows the guiding system 10 to be used with couplers 5 that have an oversized apron because the apron slides under the bottom edge 117 of the stop 112.

Now referring to FIG. 3, the stop 112 is formed as an angled plate, having a first edge 118 attached to the guide surface 111 and a second edge 119 attached to the pillar sleeve 120. The horizontal dimensions of the stop 112 are selected so that under the conditions of the removable wings 109 being mounted on the pillars 107, the spacing between the stops 112 attached to each wing 109 will not allow the coupler 5 to completely penetrate between the stops 112 and strike the tow vehicle 1.

The overall dimensions of the guide system 10 are selected to result in a wide V guide opening, opposite the apex of the V channel. In the preferred embodiment, the opening is 18 inches. The coupler 5 may be initially engaged by a guide surface 111 on either side of the V channel. This initial engagement may be many inches left or right of the apex of the V guide opening. As the tow vehicle 1 is driven rearward, closer to the trailer vehicle 6, the coupler 5 slides along the guide surface 111, thereby guiding the coupler 5 toward the ball 4. This movement continues until the coupler 5 engages the stop 112. At this time, strong torque and bending forces may be built up by the frame of the trailer vehicle 6 which position the coupler 5 against the guide surface 111 and stop 112. The coupler 5 is lowered over the ball 4 using the weight of the trailer vehicle 6 to overcome the built up forces and slide vertically below the bottom edge 117 of the stop 112. If the coupler 5 is manufactured with an apron extending beyond the vertical edges of the coupler 5, the apron will be the first to slip under edge 117. At this time, the coupler 5 may move forward toward the tow vehicle 1 to better position the coupler 5 over the ball 4.

After the alignment process and engagement of the coupler 5 with the ball 4, the pillars 107 remain attached to the hitch 2, either by the base plate 103 or are integrally fabricated as part of the hitch 2. The pillars may now be used to mount certain accessories to the tow vehicle 1. Selected types of this accessory equipment may be mounted between the tow vehicle 1 and the trailer vehicle 6 even while the vehicles are in motion to assist in the handling of additional cargo. Accessories may be items such as: bike rack carrier; spare tire carrier; cargo rack carrier; ski rack carrier; motorcycle carrier; personal watercraft carrier; utility tool carrier; surfboard carrier; sun shade or awning carrier; solar panel carrier; satellite TV mount; flag pole carrier; spot light panel carrier, etc., as well as tools such as a light duty hoist; etc. of course if the tow vehicle is to be in motion, the accessories must not interfere with the articulation of the trailer vehicle 6.

If the tow vehicle is not in motion, the list of accessories may be yet expanded to include tailgate table; tailgate work bench; rear end collision barrier; personal assistance vehicles for the handicapped; etc.

If the weight of the accessory and the contents therein are cannot be held ridged by simply mounting the accessory device over the pillars 107, additional support and stabilization may be added in the form of a V support coupled directly to the ball 4 and providing ridged arms which attach to selected points of the accessory thereby providing a tripod type of mounting for the accessory.

As can been seen, the arrangement is adapted to accommodate the wide range of sizes, shapes and placements of hitches and couplers commercially available. Slight changes in size and shape of this invention may be used to accommodate any special manufactured or new line of hitch and/or coupler which may be selected by vehicle manufacturers.

Since certain change may be made in the above apparatus without departing from the scope of the invention herein involved, it is intended that all matter contained in the above description, as shown in the accompanying drawing, shall be interpreted in an illustrative, and not a limiting sense.

What is claimed is:

1. A guide system attachable to a tow vehicle having a ball which may accept the coupler of a trailer vehicle, and comprising, in combination:

a plurality of pillars, having a preselected non-rotatable cross section, mounted on said tow vehicle in preselected positions to the side and in front of said ball;

a plurality of wings at least one removably mountable on each of said pillars thereby forming a guide channel means for said coupler, said guide channel means incorporating a stop means near the apex of said guide channel means of a preselected shape which, under the condition of said tow vehicle being moved to capture said coupler within said guide channel means, first, guides said coupler along said guide channel, second, halts the forward movement of said coupler within said guide channel means when said coupler is in a position to be lowered over said ball and third, upon the condition of said coupler being lowered over said ball releases any tension between said coupler and said guide channel means whereupon said plurality of wings may be removed from said pillars.

2. A guide system attachable to a tow vehicle hitch, having a hitch receiver, a draw bar and a ball mountable on the draw bar by a shaft, which may accept the coupler of a trailer vehicle, and comprising, in combination:

base plate means of a preselected shape to allow said base plate to be non-rotatably mountable at least by said shaft onto said draw bar;

a plurality of pillars fabricated of a preselected non-rotatable cross section and mounted on said base plate means in a preselected position to the side and in front of said ball;

a plurality of wings at least one removably mountable on each of said pillars thereby forming a guide channel means for said coupler, said guide channel means incorporating a stop means near the apex of said guide channel means of a preselected shape which, under the condition of said tow vehicle being moved to capture said coupler within said guide channel means, first, guides said coupler along said guide channel, second, halts the forward movement of said coupler within said guide channel means when said coupler is in a position to be lowered over said ball and third, upon the condition of said coupler being lowered over said ball releases any tension between said coupler and said guide channel means whereupon said plurality of wings may be removed from said pillars.

3. A guide system attachable to a tow vehicle hitch, having a hitch receiver, a draw bar and a ball mountable on the draw bar by a shaft, which may accept the coupler of a trailer vehicle, the guide system positioning the coupler over the ball to allow the coupler to be removably attached to the ball, and comprising, in combination:

an offset insert having first walls forming a hole preselected to accept the shaft of said ball;

a base plate mountable in a preselected position on said draw bar of said hitch around said offset insert having, in combination;

a rear most edge;

a torque plate mounted on said rear most edge;

a plurality of second walls forming set screw holes in said torque plate;

a set screw mounted in each said set screw hole, the tip of each said set screws positionable against an edge of said draw bar;

whereby, under the condition of said shank of said ball mounting said offset insert and said base plate on said draw bar and said set screws positioned, rotational movement of said base plate is prevented during the guiding of said coupler over said ball;

a front edge shaped to allow said base plate to fully engage the upper surface of said draw bar;

pillar mounts formed in said base plate on each side of said front edge thereby being to the side and in front of said ball;

a pillar formed in a preselected non-rotatable cross section mounted on each said pillar mount and placed in a preselected position to not interfere with the mounting of said base plate onto the upper surface of said draw bar;

wings, having a first end and a second end;

a guide surface formed between said first and said second end;

said first end forming a non-rotatable channel removably mountable over one of said pillars so that said guide surfaces are in opposing configuration to form a V channel;

stop means having a preselected stepped shape mounted near said first end;

whereby under the condition of at least two of said wings being installed over said pillars, said V channel being engagable by said coupler and as said coupler is being guided along said guide surface toward the apex of said V channel as said tow vehicle is moved toward said trailer vehicle, said coupler is positioned over, to be engagable with, said ball with a step wise, vertical movement of said coupler along said stop means whereupon said plurality of wings may be removed from said pillars.

4. The guide system arrangement defined in claim 3 further comprising a bow tie mounted on said base plate in a preselected position near said front edge for structural integrity.

5. The guide system arrangement defined in claim 3 wherein:

said offset insert may be formed in preselected portions.

6. The guide system arrangement defined in claim 3 wherein said guide surface further comprises a material having a low coefficient of friction.

7. A guide system attachable to a tow vehicle hitch receiver to provide a ball which may accept the coupler of a trailer vehicle, the guide system positioning the coupler over the ball to allow the coupler to be removably attached to the ball, and comprising, in combination:

a draw bar removably insertable into said hitch receiver;

a base plate fabricated in the upper surface of said draw bar;

a ball mountable on said draw bar by a shaft in a preselected position through said base plate;

pillar mounts fabricated as part of said base plate and positioned in a preselected location on each side and in front of said ball;

a pillar formed in a preselected non-rotatable cross section and mounted on each said pillar mount;

wings, having a first end and a second end;

a guide surface formed between said first end and said second end;

said first end forming a non-rotatable channel removably mountable over one of said pillars thereby positioning said guide surface of each wing in opposing configuration to form a V channel with said ball near the apex of said V channel;

stop means having a preselected stepped shape mounted near said first end;

whereby under the condition of at least two of said wings being installed over said pillars, said V channel being engagable by said coupler and as said coupler is being guided along said guide surface toward the apex of said V channel as said tow vehicle is moved toward said trailer vehicle, said coupler is positioned over, to be engagable with, said ball with a step wise, vertical movement of said coupler along said stop means whereupon said plurality of wings may be removed from said pillars.

8. The guide system arrangement defined in claim 1 wherein upon completion of the guiding of said coupler over said ball, the engagement of said coupler with said ball and the removal of said wings, said pillars are available to support user selected accessory equipment having pillar sleeves mounted on said accessory equipment in a position to removably engage said pillars.

9. The guide system arrangement defined in claim 2 wherein upon completion of the guiding of said coupler over said ball, the engagement of said coupler with said ball and the removal of said wings, said pillars are available to support user selected accessory equipment having pillar sleeves mounted on said accessory equipment in a position to removably engage said pillars.

10. The guide system arrangement defined in claim 3 wherein upon completion of the guiding of said coupler over said ball, the engagement of said coupler with said ball and the removal of said wings, said pillars are available to support user selected accessory equipment having pillar sleeves mounted on said accessory equipment in a position to removably engage said pillars.

11. The guide system arrangement defined in claim 7 wherein upon completion of the guiding of said coupler over said ball, the engagement of said coupler with said ball and the removal of said wings, said pillars are available to support user selected accessory equipment having pillar sleeves mounted on said accessory equipment in a position to removably engage said pillars.

12. The guide system arrangement defined in claim 8 further comprising support means coupled to said ball to provide a tripod mounting for said accessory equipment under the condition of said coupler for said trailer vehicle being disconnected from said ball.

13. The guide system arrangement defined in claim 9 further comprising support means coupled to said ball to provide a tripod mounting for said accessory equipment under the condition of said coupler for said trailer vehicle being disconnected from said ball.

14. The guide system arrangement defined in claim 10 further comprising support means coupled to said ball to provide a tripod mounting for said accessory equipment under the condition of said coupler for said trailer vehicle being disconnected from said ball.

15. The guide system arrangement defined in claim 11 further comprising support means coupled to said ball to provide a tripod mounting for said accessory equipment under the condition of said coupler for said trailer vehicle being disconnected from said ball.

* * * * *